United States Patent [19]

Lese et al.

[11] Patent Number: 4,761,800
[45] Date of Patent: Aug. 2, 1988

[54] METHOD AND APPARATUS FOR DETECTING A RATE OF DATA TRANSMISSION

[75] Inventors: Gregory Lese, Howell; John D. Price, Colts Neck; Ralph E. Richardson, Tinton Falls, all of N.J.; Cu T. Than; Mark D. Vancura, both of Whitehall, Pa.

[73] Assignees: American Telephone and Telegraph Company, AT&T Bell Laboratories; AT&T Information Systems, Inc., both of Murray Hill, N.J.

[21] Appl. No.: 20,483

[22] Filed: Mar. 2, 1987

[51] Int. Cl.⁴ .......................................... H04L 25/40
[52] U.S. Cl. ..................................... 375/117; 370/49; 375/121
[58] Field of Search ........................... 377/49, 52, 130; 375/10, 106, 117, 118, 119, 121; 370/41, 48, 49, 84, 108; 178/69 M

[56] References Cited

U.S. PATENT DOCUMENTS

| | | | |
|---|---|---|---|
| 4,001,504 | 1/1977 | Hendrickson | 375/121 |
| 4,101,732 | 7/1978 | Suzuki | 370/48 |
| 4,210,777 | 7/1980 | Bowerman et al. | 375/117 |

OTHER PUBLICATIONS

Book: McNamara, John E., *Technical Aspects of Data Communication*, Medford, MA: Digital Equipment Corporation, 1977, pp. 11–15; 335–341.

Primary Examiner—Benedict V. Safourek
Attorney, Agent, or Firm—Samuel R. Williamson

[57] ABSTRACT

An asynchronous interface for coupling data between a terminal and a data module is provided. The asynchronous interface directly determines and matches to the rate of serial data being transmitted by the terminal and received by the data module with minimal involvement of a processor associated with the data module. The asynchronous interface determines the rate of the data being transmitted by configuring counting circuitry therein for measuring the period of the start bit in the first received character whenever the speed of data being transmitted by the terminal must be determined. The asynchronous interface then adjusts to the newly determined data rate and receives the remaining bits in the first character and subsequent characters at the new rate. The processor is involved only to request that the asynchronous interface determine the incoming data rate and match to it and, once the data rate has been determined and matched, to process the recovered characters and this new rate. While the asynchronous interface determines and matches to the incoming data rate, the processor is freed for other tasks.

12 Claims, 4 Drawing Sheets

METHOD AND APPARATUS FOR DETECTING A RATE OF DATA TRANSMISSION

BACKGROUND OF THE INVENTION

1. Technical Field

This invention relates to digital communications systems and, more particular, to a method and apparatus for detecting and matching a data transmission rate between devices within such systems.

2. Description of the Prior Art

With the advent of large databases allowing information retrieval services, there has been a proliferation of various terminals, and computer configurable as terminals, in both businesses and homes for use with these databases.

Communication with a database is usually obtained through use of a data module which connects a terminal to the database through the telephone switched network. Data communications between the data module and the terminal may be in either of the well known bit synchronous or character asynchronous formats.

When a terminal operating in the asynchronous format is connected to a data module, seldom is the data going between the device initially at the same speed. Rather, switches must often be manipulated on both devices in some systems to achieve the proper data speed match.

One approach in some systems has been to provide speed matching in the data module wherein the data module adapts to the speed of the connected terminal. Generally in this arrangement, the speed matching is accomplished by having a processor in the data module scan the received data lead very rapidly. This allows the processor to determine the speed of the character being transmitted by the terminal and match the speed of the data module thereto. Unfortunately, many other activities must be performed by the processor during the speed matching period of a data telephone employed in an Integrated Service Digital Network (ISDN) or a Digital Communications Protocol (DCP). In systems employing these protocols, the processor is therefore not normally available to do this sampling of data in order to determine the data transmission rate.

Another approach known in the art is to use the synchronous mode of a universal synchronous asynchronous receiver transmitter (USART) to match the speed of data from the terminal. The terminal receiver is placed in a bit synchronous receive mode by an associated processor using a specific predetermined control character. After determining the speed, the USART is placed back into the asynchronous mode to recover further characters. While the speed of transmission can be detected, this approach cannot reliably receive the first character, or may have problems receiving a second character if it arrives at a high speed with no additional delay. This approach also requires the use of a USART which is costly and therefore less acceptable where low cost in a system is desirable.

SUMMARY OF THE INVENTION

In accordance with the invention, there is provided an improved asynchronous interface for coupling data between a terminal and a data module. This asynchronous interface determines the speed of data being transmitted by the terminal and received by the data module by measuring the period of the start bit in the first received character, adjusting to this data speed and receiving the remainder of the bits in this and subsequent characters at the new speed. For proper operation, the first data bit in the first received character from the terminal must be a logic ONE which is provided, for example, by a carriage return.

In determining the data rate, involvement of a processor associated with the data module is minimal. The processor is involved initially to request that the asynchronous interface determine the incoming data rate and match to this rate. After the rate has been determined and matched by the asynchronous interface, the processor is involved once again to process the recovered character and new data rate. While the asynchronous interface determines and matched to the incoming data rate, the processor is freed for other tasks.

In operation, the asynchronous interface measures the speed of the start bit, and therefore the data rate, by converting a baud rate counter from its normal count down mode into a data speed determining mode. During normal operation when the speed of data being received by the data module is known, the baud rate counter reduces the count of a high speed clock to 16 times the known baud rate and uses this count to sample the middle of each bit in each character of the received data. When the speed of data being transmitted by the terminal and received by the data module must be determined, the baud rate counter is initialized at a predetermined count such as zero and activated at the beginning of the start bit of the first character. When a logic level one-to-zero transition occurs, which represents the leading edge of the start bit, the baud rate counter begins counting pulses from the high speed clock and continues to increment until a logic level zero-to-one transition occurs, which represents the end of the start bit and the beginning of the first data big. At this point, the counter is inhibited and its count, which reflects the baud rate, is loaded into the status register, thereby allowing the processor to read the new baud rate. The baud rate counter is then returned to its normal count down mode to generate the 16 times clock of the just determined data speed. The remaining bits in the initial character, as well as those in subsequent characters are all recovered at this new rate.

BRIEF DESCRIPTION OF THE DRAWING

The invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
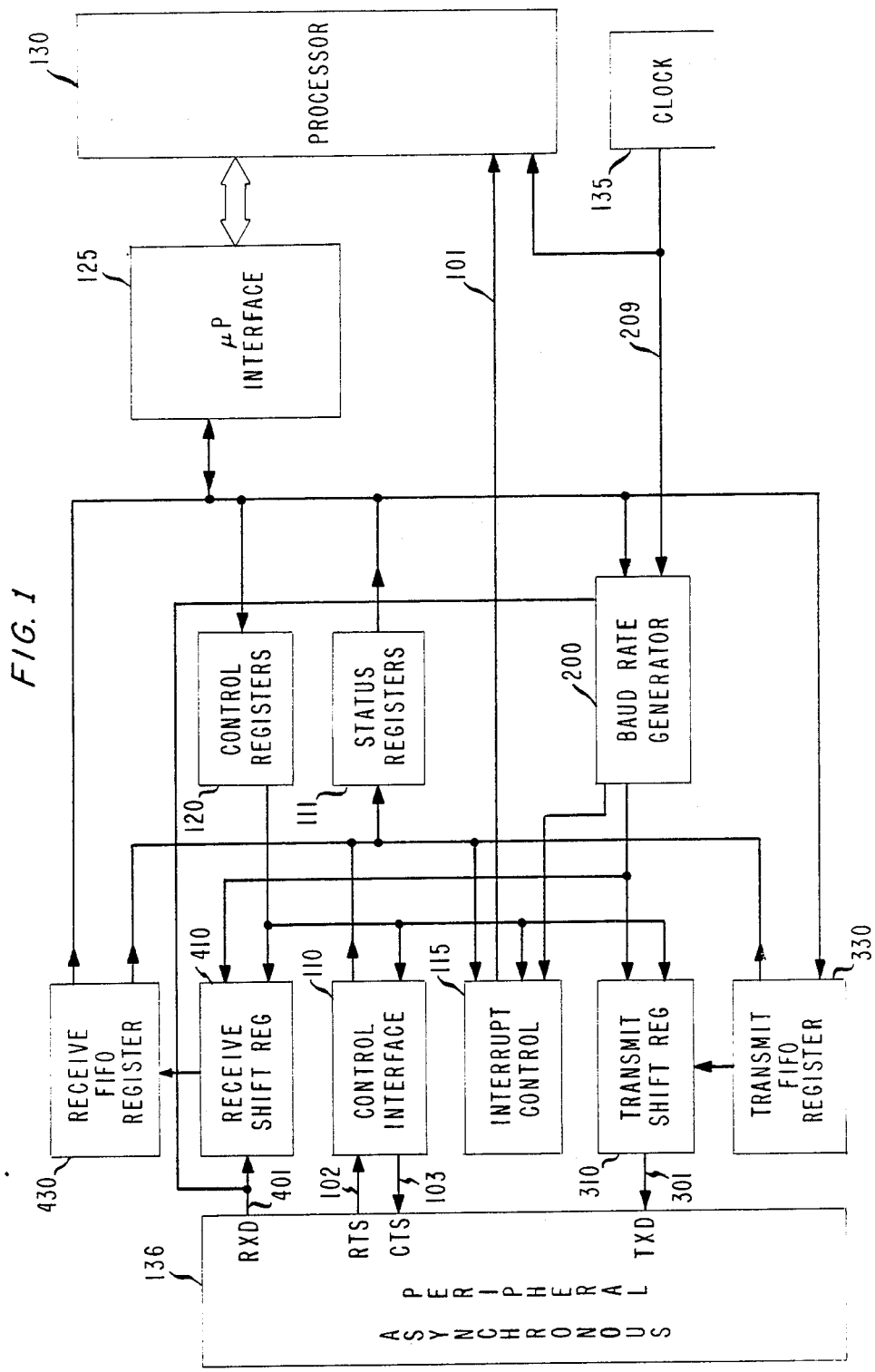
FIG. 1 is a block representation of the major functional components of the asynchronous interface operative in accordance with the principles of the present invention.

Referring now to FIG. 1 of the drawing, in accordance with the present invention there is shown a functional block representation of an asynchronous interface for providing a communication link between a a data module (not shown) and a serial asynchronous peripheral 136 such as a data telephone. Included in the data module is a processor 130 which interacts with and is connected to the asynchronous interface. Processor 130 may be one of many processors such as the 8088 microprocessor available from Intel Corporation.

Operation of this asynchronous interface is, in part, similar to that of a classical universal asynchronous receiver transmitter (UART). UARTs are well known in the art and are described by John E. McNamara in "Technical Aspects of Data Communication," (Digital Equipment Corporation, 1977).

As shown, the asynchronous interface comprises transmit and receive control registers 120, a control interface 110, an interrupt control 115, status registers 111, a processor interface 125 and a baud rate generator 200. Also included in the asynchronous interface are a transmit shift register 310 and a receive shift register 410 and also a transmit first-in-first-out (FIFO) data register 330 and a receive FIFO data registers 430. With control information from the processor 130, the microprocessor interface 125 controls the reading and writing of the status registers 111, control registers 120, transmit FIFO data register 330 and receive FIFO data register 430. The status registers 111 read the status of control interface 110 which interfaces with the asynchronous peripheral 136 over a clear to send (CTS) output line 103 and a request to send (RTS) input line 102.

The interrupt control 115 provides in transmit, receive, or speed matching status via interrupt control line 101 directly to the processor 130. This interrupt control 115 may also inform the processor 130 when the control interface 110 has a lead state change on lines 102.

Data from the data module is coupled from the processor 130 via the processor interface 125 and transmit FIFO data register 330 to the transmit shift register 310. The transmit shift register 310 provides data to the asynchronous peripheral 136 on transmit data (TXD) line 301. Data from the asynchronous peripheral 136 is received by the receive shift register 410 over the receive data (RXD) line 401. The receive data is then coupled to he processor 130, and therefore the data module, via the receive FIFO data register 430 and the microprocessor interface 125.

In order to determine the amount of data that maybe read by the processor 130 from the receive FIFO data register 430 or maybe written into the transmit FIFO data register 330, the status registers 111 monitor the amount of data stored in each of these registers and provide this information to the processor 130. A common clock 135 provides timing information for the processor 130 and also for the asynchronous interface via the baud rate generator 200 over line 209.

Figure 2:
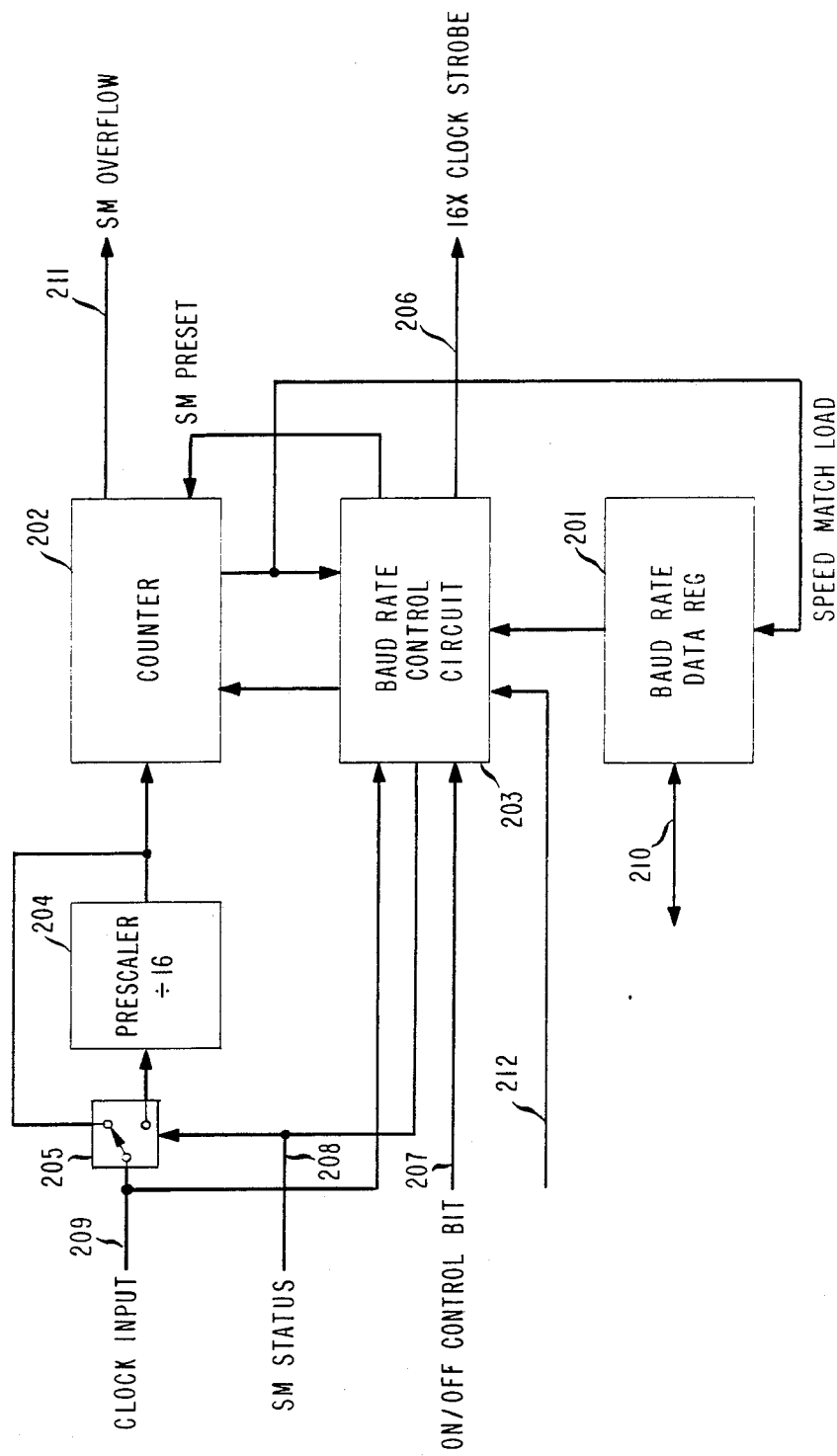
FIG. 2 shows a schematic diagram of a baud rate generator suitable for use in this invention.

Referring now to FIG. 2, there is shown circuitry suitable for use in the arrangement of FIG. 1 as the baud rate generator 200. This circuitry comprises a baud rate data register 201, an 11-bit counter 202, a baud rate control circuit 203, a prescaler 204 and a selector switch 205. The baud rate generator circuitry has two modes of operation, a normal operating mode in which a clock signal 16 times the baud rate is generated and a speed matching mode wherein the rate of transmission of data in a serial input stream from the asynchronous peripheral is determined.

During normal operation, the processor 130 shown in FIG. 1 controls the baud rate directly by writing an 11 bit rate determining count to the baud rate data register 201 over line 210 setting the baud rate. For this operating state, the processor 130 also writes via status registers 111 a normal operation on/off control bit on line 207 to the ON state. This control bit is received by the baud rate control circuit 203 which, in turn, resets the 11 bit counter 202 upon reaching a given count and also causes the selector switch 205 to couple the master clock input on line 209 directly to the 11 bit counter 202. The 11 bit counter 202 in this mode of operation is allowed to count up to the predetermined 11 bit count provided by the processor 130 and stored in the baud rate data register 201. Each time this count is reached, a clock strobe that is 16 times the predetermined received data rate is provided at line 206 from the control circuit 203. This clock strobe is used to sample the received data in the receive shift register 410, FIG. 4, and also used to clock out the data for transmission in the transmit shift register 310, FIG. 3, as will be explained in greater detail later herein. Each time the count is reached, the control circuit 203 resets the 11 bit counter 202 and the cycle is repeated.

When speed matching is desired, the processor 130 writes the on/off control bit on line 207 to the OFF state. This causes the control circuit 203 to preset the 11 bit counter 202 to a predetermined count and insert the prescaler 204 in the clock input path of the 11 bit counter via selector switch 205. Speed matching status is also provided to the processor 130 over the speed matching status line 208. The prescaler 204 reduces the clock input to the 11-bit counter 202 by the 16 so that the correct baud rate is loaded into the baud rate data register 201. The on/off control bit on line 207 when in the OFF state also inhibits the control circuit 203 from resetting the 11-bit counter 202 as during normal operation.

Speed matching of the incoming data is achieved by the baud rate generator circuitry measuring the duration of the start bit of a serial input stream of data. For proper operation, the least significant bit, that is, the first received data bit, in the first received character must be a logical ONE. This is provided by a number of characters including a carriage return.

With input from the start bit detect circuit 411 in the receiver section shown in FIG. 4 and described later herein, the duration of the start bit is determined. The start bit detect circuit 411 looks for the beginning and end of the start bit. When a logic one-to-zero transition occurs, which represent the leading edge of the start bit, the start bit detect circuit 411 provides a signal indication to the baud rate control circuit 203 over line 212. And when a logic zero-to-one transition takes place, which represents the trailing edge of the start bit, a signal representing this transition is also provided to the baud rate control circuit 203 over this same line 212.

When the beginning of the start bit signal is provided to the baud rate control circuit 203, this circuit enables the 11 bit counter 202 which begins to count at the clock rate provided by the prescaler 204. The counter 202 continues to count until the end of the start bit signal is received by the control circuit 203 which then inhibits the counter 202. The count captured in the 11 bit counter 202 is then loaded into the baud rate data register 201 and the new baud rate read by the processor 130 over line 210. The baud rate control circuit 203 then places the 11-bit counter 202 into the normal counting mode to generate the 16 times clock of the just determined data rate, and the remaining bits in the initial character, as well as subsequent characters in the data stream, are recovered at this new rate. Data rates between 300 bits per second and 19.2K bits per second are easily matched with this baud rate generator circuitry.

If too much data is entered in the counter 202 during speed matching, the counter will overflow and provide an overflow signal on line 211 to the processor 130 reflecting this error condition. This signal is provided to the processor 130 via the interrupt control 115 shown in FIG. 1.

Figure 3:
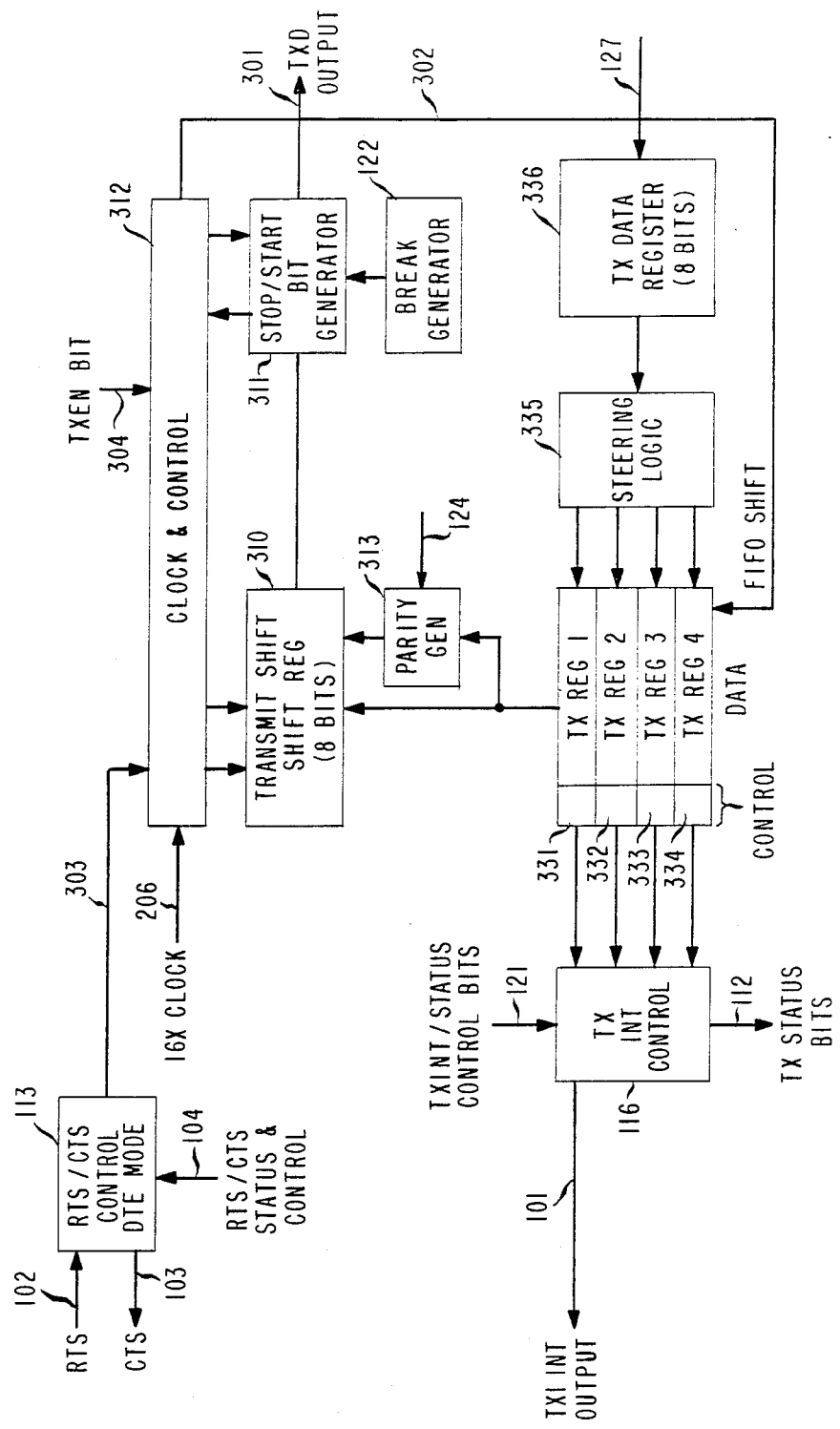
FIG. 3 shows a block diagram of a transmitter section of the asynchronous interface of FIG. 1.

Shown in FIG. 3 is a functional block diagram of the transmitter section of the synchronous interface. Data for transmission from the data module to the asynchronous peripheral 136 is coupled from the processor 130 via the microprocessor interface 125, both shown in FIG. 1, to the transmit data register 336 where it is stored. From this data register, the data is coupled to a steering logic circuit 335 which writes the data in bytes to each of multiple empty transmit registers 331 through 333. These transmit registers 331 through 334 comprise the transmit FIFO data register 330 shown in FIG. 1. The order for writing this data is to write to the least significant one of the multiple transmit registers that is empty. Then write to the second least significant transmit register and so forth.

Transmit interrupt control 116 is part of the interrupt control 115 shown in FIG. 1 and provides the transmit interrupt signal from the asynchronous peripheral to the processor 130 over line 101. This control 116 also provides a status line 112 for enabling the processor 130 to monitor the number of empty transmit registers and thereby write more than one byte of data at a time.

A transmit interrupt status control signal from the control registers 120 in FIG. 1 is coupled over line 121 to the transmit control 116 to control the transmit registers 331 through 334. Data written to a more significant transmit register ripples down to the next most significant transmit register until it reached the least significant transmit register. By way of example, data written to the transmit register 334 will ripple down through registers 333 and 332 to the transmit register 331 where it is coupled to the transmit shift register 310. Also responsive to the control registers 120 is the parity generator 313. With input from the control registers 120 over line 124, this generator generates the proper parity and loads it into the most significant bit of the 8-bit transmit shift register 310.

The clock and control circuit 312 clocks the data from the transmit shift register 310 via the stop/start bit generator 311 to the serial transmit data output line 301. A general enable signal for controlling the transmit data from the clock and control circuit 312 is provided by the processor 130 over line 304 as transmit enable (TXEN). The 16 times baud rate clock signal on line 206 to the clock and control circuit 312 is from the baud rate generator 200 and controls the frequency or baud rate of the transmit data that is provided out to an asynchronous peripheral on line 301. And an output from a request to send/clear to send mode control circuit 113 on line 303 provides a mode control signal to the clock and control circuit 312 for regulating the clocking out of the transmit data.

Under the control of the clock and control circuit 312, the stop/start bit generator 311 generates a start bit at the beginning of a data byte and also generates a stop bit at the end of the data byte. One or two top bits are selectable. Break generation is achieved via the break generator 122 which forces the TXD line 301 to a logic zero level for at least 10 consecutive bit periods. This break generation signal is controlled by control registers 120 shown in FIG. 1.

The mode control circuit 113 is part of the control interface 110 of FIG. 1 and interfaces with the asynchronous peripheral over the RTS line 102 and CTS line 103. The mode of this control circuit is controlled by a status bit provided by control registers 120 over line 104. When the asynchronous interface is connected to an asynchronous peripheral operating in the data terminal equipment (DTE) mode, the control mode circuit 113 uses the CTS output line 103 as an indication to the asynchronous peripheral that there is data to be transmitted on the TXD output line 301. When the asynchronous peripheral is able to accept this serial data on line 301, it provides a logical zero level on the RTS input line 102. This data in the transmit register 310 is then shifted out via the stop/start bit generator 311 to the output line 301.

Figure 4:
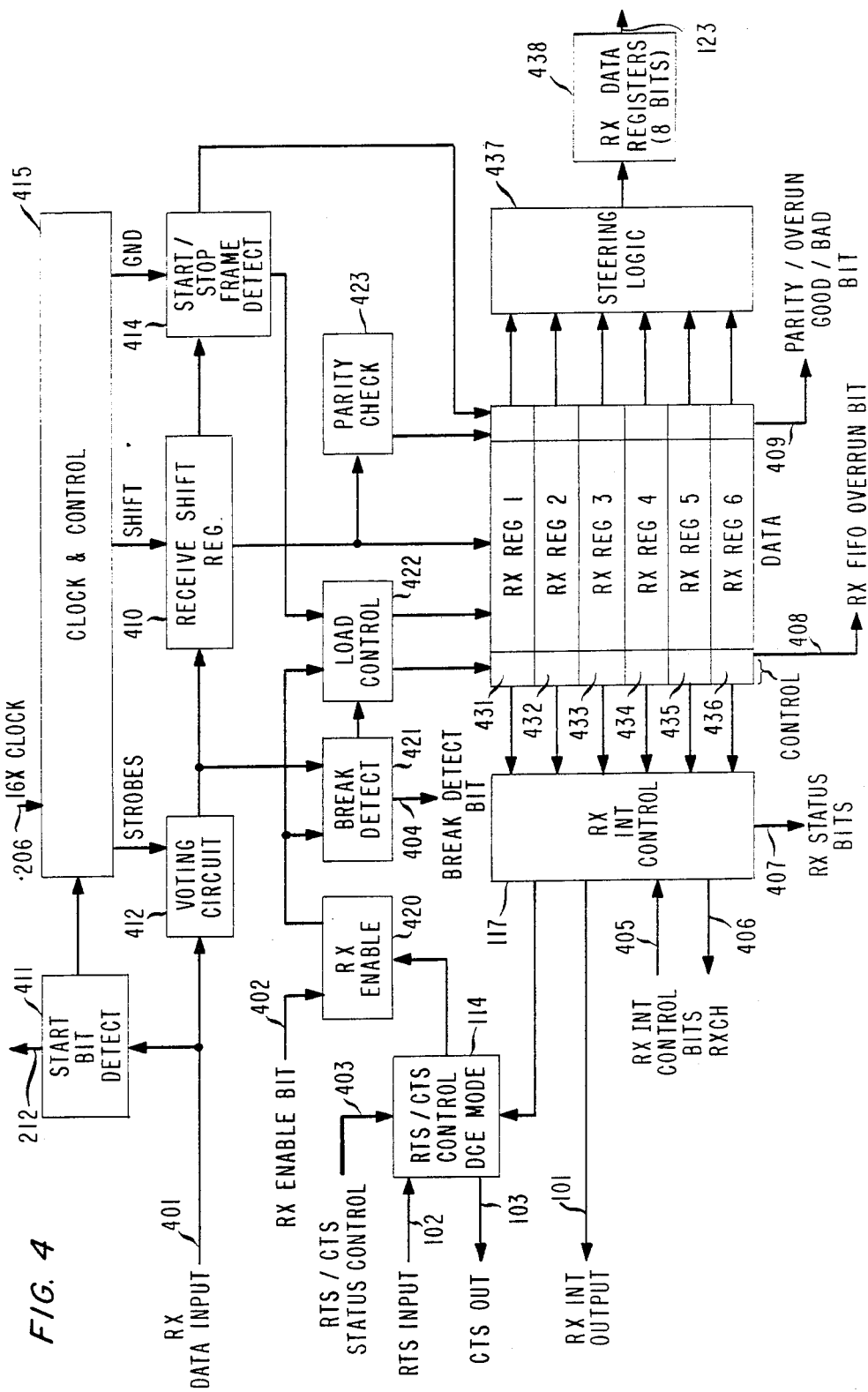
FIG. 4 shows a block diagram of a receiver section of the asynchronous interface of FIG. 1.

Referring now to FIG. 4, there is shown a functional block diagram of the receiver section of the synchronous interface. Data from the asynchronous peripheral is received over line 401 by the asynchronous interface and is coupled into the receiver section via a start bit detector 411 and a voting circuit 412. The start bit detector 411 provides information about the duration of the start bit to the baud rate generator 200 as discussed earlier herein. The start bit detector also provides information about the start bit to a clock and control circuit 415. This clock and control circuit 415, in turn, provides three clock strobes to the voting circuit 412 for sampling the received input data. Such sampling is incorporated to increase the noise immunity of the receiver section. With the three clock strobes, the voting circuit 412 samples each receive data bit three times in the middle of the bit period. For example, if two zero logic levels and a one logic level are measured, a logic zero is coupled from the voting circuit 412 as the selected input to the receive shift register 410. Input timing for the clock and control 415 is provided by the 16 times baud rate clock signal on line 406 from the baud rate generator 200.

After the data has been properly shifted and loaded into the receive shift register 410, it is transferred in bytes to the multiple receive registers 431 through 436, beginning with the least significant receive register 431. These registers comprise the receive FIFO data register 430 shown in FIG. 1. The data is cycled through receive registers 432, 433, 434, 435 and 436, and then coupled on to the steering logic 437. This steering logic 437 fetches the most significant data byte from the receive registers and connects it to a receive data register 438. This register is read by the processor 130 via line 123 which connects the receive data register 438 to the processor interface block 125. Load control 422 controls the loading of the data from the receive shift register 410 and clocks it into the multiple receive registers 431 through 436. This load control 422 is connected to the break detect bit 421 to disable loading whenever a break signal is detected. The load control is also connected to a start/stop frame detect 414 which examines the receive data for frame error conditions and produces an error bit signal if a framing error should occur.

A receive enable circuit 420 is used as a master receive enable control and controls when data is loaded from the receive shift registers 410 to the multiple receive registers 431 through 436. Providing input to the receive enable circuit is a request to send/clear to send mode control circuit 114. The mode control circuit 114 is part of the control interface 110 of FIG. 1 and interfaces with the asynchronous peripheral over the RTS line 102 and CTS line 103. This mode control 114 also provides a control input to the receive enable circuit 420.

When the DCE mode is selected, the RTS signal on line 102 is an input and connects an asynchronous peripheral to the asynchronous interface. When the asynchronous peripheral requests transmission of data to the asynchronous interface, it provides a logic zero level on the RTS input line 102. If the multiple receive registers 431–436 are not full, this indication being provided by the receive interrupt control 117 and if the receive section is enabled as reflected by an enable signal on line 403, then the CTS output line 103 from the control circuit 114 goes to a logical zero indicating to the asynchronous peripheral that transmission to the receiver section in the asynchronous interface may take place. The receive interrupt control 117 is a part of the interrupt control 115 shown in FIG. 1. If the multiple receive registers 431 through 436 are full of data, the CTS output line 103 will not be enabled until at least one register is available. The receive interrupt control 117 also indicates via line 101 to the processor 130 of a receive interrupt condition. This interrupt from the control registers 120 is provided to the interrupt control 117 via the receive interrupt control line 405. A status bits line 407 is connected to the status register 111 and is used for providing to this register status information regarding the receiver section.

Certain other control signals are generated in the asynchronous interface to improve processing of the data. A status signal on line 406 provides information to status registers 111 as to how many receive characters are in the receive registers 432 through 436 so that multiple reads can be made by the processor 130 to save time during polling. If interrupts are enabled, then the interrupt control 117 indicates to the processor 130 via line 101 which particular receive interrupt condition has occurred. A break bit detect 421 on line 404 indicates to the processor 130 that a break has been detected. A parity check 423 compares the parity received versus the parity selected in control registers 120. This information is used along with an overrun or frame error detect condition from the start/stop frame detect 414 as an error bit and follows the receive data word through receive registers 431 through 436. The parity information is also provided over line 409 to the status registers 111 where it is read as required.

If the receiver is enabled and the DCE mode has not been selected in control circuit 114, a receive FIFO overrun condition could possibly occur if seven or more data bytes are received before the processor 130 has read one of them. If this condition does occur, an indication as to such will be provided over control line 408 to status registers 111. In addition, the number of data bytes than in the multiple receive registers 431 through 436 will be provided from the receive interrupt control 117 via line 407 and the status registers 111 to the processor 130.

Modifications of this asynchronous interface are possible and may obviously be implemented by those skilled in the art without departing from the spirit and scope of the invention. It is to be understood, therefore, that within the scope of the appended claims, the invention may be practiced otherwise than as specifically described.

What is claimed is:

1. An asynchronous interface for coupling data between a data module and a serial asynchronous peripheral, the asynchronous interface being configurable in response to control signals from the data module and comprising:

control means responsive to the control signals from the data module;

means for receiving a serial asynchronous data stream from the serial asynchronous peripheral, the receiving means including counting means operating in a first configuration for providing a clock source for sampling and determining the one or zero state of each bit in the data being received by the asynchronous interface;

means for determining a rate of data reception of the serial asynchronous data stream being transmitted by the serial asynchronous peripheral to the asynchronous interface, the determining means including the counting means reconfigured by the control means and operating in a second configuration for measuring the duration of the period of the start bit in a first received character, the counting means incrementing up to and providing a count reflective of the period of the start bit; and rate conversion means responsive to both the control means and the counting means for realigning the data stream receiving means for receiving data at a rate reflective of the period of the start bit.

2. The asynchronous interface as in claim 1 wherein the counting means operating in the first configuration for providing a clock source further comprises a start bit detector for sensing the beginning of the start bit period.

3. The asynchronous interface as in claim 1 wherein the counting means reconfigured by the control means and operating in the second configuration for measuring the duration of the period of the start bit comprises a start bit detector configured for sensing the beginning and ending of the start bit period.

4. The asynchronous interface as in claim 3 wherein the counting means reconfigured by the control means and operating in the second configuration further includes a prescaler arranged for providing a reduced frequency clock source so that the count provided by the counting means is directly reflective of the period of the start bit.

5. The asynchronous interface as in claim 4 wherein the serial asynchronous data stream is arranged so that the first data bit in the first received character occurs in the one state.

6. The asynchronous interface as in claim 1 including means for interfacing with external processing means, the processing means providing the control signals to the control means for reconfiguring the control means whenever the rate of data reception from the asynchronous peripheral is to be determined, and the rate conversion means providing status signals to the processing means reflecting the rate of data reception from the asynchronous peripheral.

7. A method of coupling data between a data module and a serial asynchronous peripheral, the data from the synchronous peripheral being provided to a asynchronous interface configurable in response to control signals from the data module, the method comprising the steps of:

providing a controller responsive to the control signals from the data module;

receiving a serial asynchronous data stream from the serial asynchronous peripheral, the receiving step further including operating a counter in a first configuration for providing a clock source for sampling and determining the one or zero state of each bit in the data being received by the asynchronous interface;

determining a rate of data reception of the serial asynchronous data stream being transmitted by the serial asynchronous peripheral to the asynchronous interface, the determining step further including operating the counter reconfigured by the controller and operating in a second configuration for measuring the duration of the period of the start bit in a first received character, the counter incrementing up to and providing a count reflective of the period of the start bit; and realigning the counter so that it is configured for operating in the first configuration for providing a clock source for sampling and for receiving data at a rate reflective of the period of the start bit.

8. The method of coupling data between a data module and a serial asynchronous peripheral as in claim 7 wherein the counter operating in the first configuration for providing a clock source includes a start bit detector for sensing the beginning of the start bit period.

9. The method of coupling data between a data module and a serial asynchronous peripheral as in claim 7 wherein the counter reconfigured by the controller and operating in the second configuration for measuring the duration of the period of the start bit includes a start bit detector configured for sensing the beginning and ending of the start bit period.

10. The method of coupling data between a data module and a serial asynchronous peripheral as in claim 9 wherein the counter reconfigured by the controller and operating in the second configuration further includes a prescaler arranged for providing a reduced frequency clock source so that the count provided by the counting means is directly reflective of the period of the start bit.

11. The method of coupling data between a data module and a serial asynchronous peripheral as in claim 10 further including the step of arranging the serial asynchronous data stream so that the first data bit in the first received character occurs in the one state.

12. The method of coupling data between a data module and a serial asynchronous peripheral as in claim 7 further including the step of interfacing with a external processor, the processor providing the control signals to the controller for reconfiguring the controller whenever the rate of data reception from the asynchronous peripheral is to be determined, and the realigning step providing status signals to the processor reflecting the rate of data reception from the asynchronous peripheral.

* * * * *